United States Patent [19]

Abboud

[11] Patent Number: 5,939,127
[45] Date of Patent: Aug. 17, 1999

[54] FAT FREE AND LOW FAT COOKIE CREAM FILLINGS

[75] Inventor: Amna Munji Abboud, Germantown, Tenn.

[73] Assignee: Kraft Foods, Inc., Northfield, Ill.

[21] Appl. No.: 09/066,217

[22] Filed: Apr. 24, 1998

Related U.S. Application Data

[63] Continuation-in-part of application No. 08/640,429, Apr. 30, 1996, Pat. No. 5,851,576, which is a continuation-in-part of application No. 08/568,593, Dec. 5, 1995, Pat. No. 5,658,609, which is a continuation-in-part of application No. 08/268,833, Jun. 29, 1994, abandoned.

[51] Int. Cl.$^6$ ............................. A23D 7/015; A23L 1/052
[52] U.S. Cl. .......................... 426/572; 426/615; 426/604; 426/573; 426/575; 426/578; 426/804
[58] Field of Search ...................... 426/550, 471, 426/804, 572, 615, 604, 575, 578, 573

[56] References Cited

U.S. PATENT DOCUMENTS

| | | | |
|---|---|---|---|
| 3,800,036 | 3/1974 | Gabby | 426/804 |
| 5,102,680 | 4/1992 | Glass | 426/572 |
| 5,501,869 | 3/1996 | Buliga | 426/658 |
| 5,626,903 | 5/1997 | Gautchier | 426/811 |
| 5,658,609 | 8/1997 | Abboud | 426/285 |
| 5,851,576 | 12/1998 | Abboud | 426/550 |

*Primary Examiner*—Carolyn Paden
*Attorney, Agent, or Firm*—Fitch, Even, Tabin & Flannery

[57] ABSTRACT

Generally, the present invention is directed to a modification of the frosting composition disclosed in U.S. Pat. application Ser. No. 640,429, now U.S. Pat. No. 5,851,576, to utilize the fat replacement composition of that application for use in a cookie filling. The present invention is directed to a cookie cream filling composition comprising between about 60 and about 85% sweetener, between about 0.1 and about 1% gelling agent, such as a gum, pectin or gelatin, between about 0.1 and about 2% flavoring agents and other minor ingredients such as preservatives, etc., between about 0.2 and about 1.5% of a starch, between about 3 and about 10% of the fat replacement composition, between about 10 and about 20% of high fructose corn syrup and between about 10 and 20% of a polyhydric alcohol, such as glycerine, glycol and pentaerythritol. The cookie filling composition has a water activity of from about 0.25 to about 0.37. The cookie filling compositions of the present invention contain no added water. While preservatives, such as potassium sorbate can be used they are not required because of the low water activity of the cookie cream fillings.

9 Claims, No Drawings

FAT FREE AND LOW FAT COOKIE CREAM FILLINGS

CROSS-REFERENCE TO RELATED APPLICATIONS

This application is a continuation-in-part of Ser. No. 08/640,429 filed Apr. 30, 1996, now U.S. Pat. No. 5,851,576 which is a continuation-in-part of application Ser. No. 08/568,593 filed Dec. 5, 1995, now U.S. Pat. No. 5,658,609, which is a continuation-in-part of application Ser. No. 08/268,833 filed Jun. 29, 1994, now abandoned.

FIELD OF THE INVENTION

The present invention relates generally to a fat replacement composition and more particularly, to a fat replacement composition which is particularly useful for replacing the fat component in a cookie filling composition and to a cookie filling composition containing such fat replacement system.

BACKGROUND OF THE INVENTION

Fat reduction, while retaining appropriate and known organoleptic properties, is a challenge in most foods. Fat reduction in cookie cream fillings have shown special difficulties. Fat reduction in cookie cream fillings is complicated, heretofore, and has been only marginally successful. Definitely, there is a need for fat free/low fat cookie cream fillings for sandwich cookies that possess similar organoleptic properties to traditional full fat cookie cream filling counterparts.

Fat is included in cookie cream fillings to control texture and spreadability. Typical cookie cream fillings contain 30–35% fat. Up to 60% fat has been used where special effects are desired. When fat level is lowered, the fillings get harder and don't adhere together well. On the other hand, if the percentage of fat is excessive, the fillings flow too freely and squeeze out of the cookie. Also, the filling must be firm at room temperature and below so that the cookie wafers don't slide when eaten.

There are many attributes to fat in food systems; just as there are many different fats used with different structures and characteristics. Texture and mouthfeel are important and simply removing the fat, adding water and tying up the expanded water phase works in some foods, but not in major categories of food. The presence of water in cookie cream fillings would lead to serious problems in cookie shelf life. The presence of water in cookie cream fillings would increase the water activity to levels higher than the full fat cookies (typical full fat cookie cream filling water activity is 0.2–0.3) causing them to become soggy and lose crunchiness. Cookie cream fillings with high water activities (higher than 4.0), would allow water to migrate into the cookie wafers. Since the cookie wafers have significantly lower water activity, the migration of moisture into the cookie wafers makes them soggy with lack of crispy and crunchy texture.

U.S. Pat. No. 5,455,059 to McFeaters discloses fat free cookie fillings containing 20–22% water. The filling has a high range of water activity of 0.65–0.70. It is shelf stable by itself, but much higher in water activity than the cookie wafers that it is used to fill. The results would be a filled cookie with unstable shelf life.

Heretofore, conventional cookie cream fillings have generally contained relatively high levels of triglyceride fat in the form of oil and/or shortening in order to be able to provide the desired shelf stability, spreadability and organoleptic properties. As used herein, the term "fat" is intended to mean triglyceride materials but does not include non-triglyceride materials that analyze as fat such as mono and diglycerides based emulsifiers. It would be desirable to be able to provide cookie cream fillings having a lower fat content, and most desirably, cookie cream fillings containing essentially no fat.

It would be desirable to provide a fat replacement composition which when incorporated into cookie cream fillings as a replacement for fat, results in an essentially fat free cookie cream filling that is equivalent to shortening containing low fat cookie cream fillings. Cookie cream fillings have an additional requirement of needing a low water activity of less than about 0.37. If the water activity is above about 0.37, water migration from the cookie cream filling to the cookie wafer will occur.

Inulin has been proposed as a fat replacement or substitute in a wide variety of food products and applications. Inulin is a non-crystalline, fibrous solid polysaccharide or mixture of polysaccharides containing beta-1,2 bonded glucofructan polymers of varying molecular weights terminated at the reducing end by a glucose ring. Thus, inulin is a series of repeating 5-member fructose rings terminated by a 6-member glucose ring. Inulin may be represented by the formula $GF_n$ where G is a glucose ring, F is a fructose ring and $n$ is the number of fructose rings. Inulin may be derived from various plant tubers, such as dahlia, sunchoke flower, jerusalem artichokes and chicory. Commercially available inulin is generally obtained by water extraction from chicory and is available in several degrees of polymerization (DP), generally between 2 to 15. The average value of $n$ is generally in the range of from about 8 to about 13 depending upon the extraction processing conditions and in most instances, inulin of the general formula $GF_n$ is non-digestible when the $n$ value is greater than about 2.

Inulin is available commercially from Cosucra under the tradename FIBRULINE and from Rhodia under the tradename RAFTILINE in the form of a free flowing spray dried powder or agglomerate. Inulin acts as a gelling agent when dispersed and hydrated in water. Attempts to directly incorporate commercially available inulin as a replacement for fat in cookie cream fillings were not successful in that it was difficult to fully hydrate the inulin with the result that the cookie filling had an undesirable sandy or gritty texture or mouthfeel rather than the creamy mouthfeel of homemade cookie fillings. The cookie cream filling also had a runny consistency of too low viscosity to properly cling to the surface of the cookie. Further, the cookie cream filling had a stringy texture that was not easily spreadable. Although after standing one or two days, the inulin containing cookie cream filling gelled sufficiently to provide some spreadability, inability to produce an immediately spreadable cookie filling with good texture and mouthfeel caused inulin to initially be deemed to be an unacceptable fat substitute for cookie cream fillings.

SUMMARY OF THE INVENTION

Generally, the present invention is directed to a modification of the RTS frosting composition disclosed in U.S. patent application Ser. No. 640,429 to utilize the fat replacement composition of that application for use in a cookie filling. The fat replacement composition system comprises between about 60 and about 93% inulin, between about 4% and about 30% of a first emulsifier selected from the group consisting of mono- and diglycerides, propylene glycol monoesters, lactic acid ester of monoglycerides and mixtures thereof, and between about 3 and about 30 percent of a second emulsifier selected from the group consisting of diacetyl tartaric acid ester of monoglycerides (DATEM), lecithin and mixtures thereof.

DETAILED DESCRIPTION OF THE INVENTION

The present invention is directed to a cookie cream filling composition comprising between about 60 and about 85% sweetener, between about 0.1 and about 1% gelling agent, such as a gum, pectin or gelatin, between about 0.1 and about 2% flavoring agents and other minor ingredients such as preservatives, etc., between about 0.2 and about 1.5% of a starch, between about 3 and about 10% of the fat replacement composition, between about 10 and about 20% of high fructose corn syrup and between about 10 and 20% of a polyhydric alcohol, such as glycerine, glycol and pentaerythritol. The cookie filling composition has a water activity of from about 0.25 to about 0.37. The cookie filling compositions of the present invention contain no added water. While preservatives, such as potassium sorbate can be used they are not required because of the low water activity of the cookie cream fillings.

The fat replacement system contains between about 60 and about 93% inulin. Generally, the inulin has a DP not less than about 8, and has a gel strength of between about 180 and about 250 gm. The gel strength is measured on a TA-XT2 texture analyzer available from Stable Micro Systems of Haslemere, Surrey, England using a TA-4¼ inch diameter acrylic cylinder probe with a radius edge. The force, in grams, required to cause the probe to penetrate 5 mm into the sample is the gel strength or firmness of the sample. The gel strengths indicated herein were measured at room temperature 24 hours after preparation of a 30% solids aqueous inulin sample.

When inulin comprises the entire fat replacement system and is directly mixed with the other cookie filling ingredients, cookie cream fillings made therefrom have poor spreadability and insufficient viscosity, i.e., thickness, upon formulation to provide a desirable product and have an undesirable gritty and dry mouthfeel.

It has been discovered that particular combinations of emulsifiers at particular concentrations when combined with inulin and dried to form a particulate homogeneous product, such as by spray drying, function to complex, modify and stabilize the inulin in a manner such that the resulting composition may be used as a fat replacement in cookie cream fillings. Indeed, certain combinations of emulsifiers appear, although the reasons therefore are not fully understood, to exhibit a synergistic effect when the fat replacement system is employed as a cookie cream filling. Further, cookie cream fillings may be prepared in which triglyceride fat is completely eliminated and which are fully equivalent to presently available low fat (less than 6%) cookie cream fillings. As used herein, the term "fat free" is intended to mean products that are permitted to be labeled as such by government regulations. Cookie cream fillings containing less than about 0.5 g fat per 11 gram serving size can be labeled "fat free"; those containing less than about 3 g fat per 11 gram serving size are considered to be "low fat".

While the primary emphasis of the present invention is to provide a fat replacement composition that can be conveniently employed to prepare a fat-free cookie cream filling, it should be understood that the fat replacement composition is also useful at higher levels, to prepare cookie cream fillings that are labeled "low fat" due to the presence of ingredients such as mono- and diglycerides, that analyze as fat. It is also possible to include the fat replacement composition in cookie cream fillings that include some triglyceride fat.

The fat replacement composition contains a first emulsifier selected from the group consisting of mono and diglycerides, propylene glycol monoesters, lactic acid ester of monoglycerides and mixtures thereof.

The mono- and diglyceride emulsifier is a mixture of monoglycerides (the active component) and diglycerides generally containing in excess of 25% monoglycerides, preferably in excess of 40% monoglycerides, and having an I.V. between about 40 and about 75. Mono- and diglycerides are available from a large number of commercial sources. The mono-diglyceride may be prepared by known procedures involving the reaction of glycerin with certain fats, oils or fatty acids and is usually available as the crude reaction product which also comprises diglyceride, triglyceride, glycerin and free fatty acid. Commercial monoglycerides are also available in a relatively pure distilled form which may be used in place of the mixture. Both alpha and beta isomers of monoglyceride are included in varying amounts, depending on whether the esterification occurs at the terminal or center carbon atom of the glycerin, but these isomers equilibrate by acyl migration upon storage to result in about 88% alpha monoglyceride.

Cookie cream fillings containing a fat replacement system comprising only inulin and a first emulsifier are generally gritty and too soft and runny to provide an acceptable cookie cream filling although the combination of inulin with the first emulsifier does improve the spreadability of the cookie cream filling in the as formulated state to some extent. Experiments have established the general interchangeability of the first emulsifiers all of which have a relatively low HLB, i.e., 4.0 or lower. Other emulsifiers having generally similar emulsifying properties when incorporated in inulin fat replacement compositions are also contemplated as within the scope of the invention.

Propylene glycol monoester is commercially available as a food grade emulsifier from a number of sources containing from about 30%–60% propylene glycol monoester, most preferably 50–60% propylene glycol monoester, which is the active component. The fatty acid used in the esterification reaction is preferably saturated and has a chain length of from 12 to 22 carbon atoms, preferably palmitic or stearic acid, or admixtures thereof and has an I.V. of between about 40 and about 65. Specific partial esters which are suitable are propylene glycol monostearate, propylene glycol monopalmitate, propylene glycol monolaurate, alone or in combination with the comparable diesters and each other. Lactic acid esters of monoglycerides are also available from a large number of commercial sources.

Lactic acid ester of monoglycerides is the monoglyceride, or mixtures of mono- and diglycerides, as described herein, further esterified with lactic acid.

It has been found that the inclusion in the fat replacement system of a second emulsifier selected from the group consisting of diacetyl tartaric acid ester of monoglyceride (DATEM), lecithin and mixtures thereof results in cookie cream fillings having a somewhat duller appearance like that of a fat containing cookie filling and a much improved thickness and spreadability immediately upon formulation.

DATEM is commercially available from a number of sources, for example, under the tradename PANODAN from Danisco, the monoglyceride chain being predominantly $C_{16}$–$C_{18}$. Lecithin is also widely available from a number of commercial sources.

The second emulsifier may also include, at a level of up to 6% of the fat replacement composition, sodium steroyl 2-lactylate.

The good physical attributes of the fat free cookie cream fillings are maintained over extended shelf life of up to one year or more when the combination of a first and second emulsifier is employed in the inulin containing fat replacement composition. The exact mechanism by which the combination of first and second emulsifiers complexes and/ or stabilizes the inulin is not known. However, manufacturing and taste testing have demonstrated that a fat replacement composition as described herein results in a fat free cookie cream filling that compares favorably to conventional fat containing cookie cream fillings.

Fat free cookie cream fillings containing the disclosed fat replacement composition can be formulated that have a very low water activity ($A_w$) of from about 0.25 to about 0.37 without sacrificing physical or organoleptic properties of the cookie filling and which do not support bacterial spoilage. Water activity is the ratio of the partial pressure of water in a composition to the vapor pressure of pure water at the same temperature and is a measure of the free or unbound water present. Cookie fillings with high water activities of about 0.37 generally allow moisture migration into the cookie wafer causing them to lose crispy and crunchy texture.

In accordance with the present invention, fat free and low fat cookie cream fillings can be prepared that have an $A_w$ below about 0.37, for example from about 0.25 to about 0.37, without sacrificing either physical or organoleptic properties.

The cookie cream filling of the present invention contains no water addition and has a very low water activity of from about 0.25 to about 0.37. Using a cookie cream filling with water activity of 0.4–0.6 would cause sogginess because of water migration from the cookie cream filling to the baked cookie wafer.

The substantially fat free-low fat cookie cream filling of this invention is not only as smooth in texture as a cookie filling containing substantial levels of fat, but it has the added advantage of being shelf stable and tastes like a full fat cookie cream filling. A shelf life study for this type of filling was done for a period of four months and the cookies still had good appearance and texture which is better than commercial reduced fat cookie cream fillings available in grocery stores.

The ingredients of the fat replacement composition are preferably hydrated together to form a homogeneous slurry, mixed for a period of time sufficient to hydrate the inulin and then spray dried to provide a particulate free flowing powder which is conveniently added to the other ingredients in the manufacture of a cookie cream filling. The slurry generally has a solids content of between about 40 and about 65 percent, and is spray dried in accordance with standard spray drying techniques, for example, inlet temperatures of between about 360° and 400° and outlet temperatures of between about 160° and about 200° F., to provide a free flowing particulate material that is convenient to use when manufacturing cookie cream fillings.

In order to provide for convenient preparation of the fat replacement composition using conventional fluid handling equipment, the combining, mixing and handling of the ingredients is carried out under conditions that minimize or retard gelation of the inulin. If the inulin containing mixture is subjected to high shear, the inulin will quickly gel into a semisolid mass which is difficult to pump and spray dry.

The ability of the inulin to hydrate in a reasonable period of time has been found to be both temperature dependent and pH dependent. The water used to form the slurry prior to spray drying should be hot, i.e., above 130° F., preferably 160° F. and the pH of the slurry should be maintained above about 6.0, preferably in the range of about 6.2 to about 6.8.

Careful control of the pH during formulation and spray drying is particularly necessary when DATEM is used as the second emulsifier. DATEM at 10% solids in water has an acid pH of about 2.4 and DATEM containing fat replacement compositions of the type described herein, without appropriate pH adjustment, have pH's well below 6.0, for example, 3–4.5. Control of the pH of the inulin containing slurry to above 6.0 during mixing and spray drying may be accomplished by the addition of any of a number of known pH adjusting agents such as dipotassium phosphate, disodium phosphate, trisodium phosphate, hexametaphosphate and sodium citrate dihydrate may be conveniently employed. The materials also help to prevent protein precipitation by sequestering any metallic ions present as, for example, in hard water. About 0.5 to about 2.0% pH adjusting agent can typically be used.

A water soluble protein encapsulating agent is preferably added to the slurry to aid in spray drying. Suitable agents include sodium and potassium caseinates and soy or whey protein concentrates and isolates. Typically, between about 1 and about 5% sodium caseinate, by weight of the spray dried powder can be used, although other amounts can be used if desired.

The fat replacement composition is prepared by heating the first and second emulsifiers in a jacketed tank to approximately 160° F. (71.1° C.) under mild agitation. The protein encapsulating agent, e.g., sodium caseinate is added and dispersed thoroughly after which the water and pH adjusting agent, e.g., dipotassium phosphate, if needed, are then added and agitated until a uniform mixture is obtained. The inulin is then slowly added under mild agitation and mixing is continued until the inulin is completely hydrated, approximately 30 minutes. Thereafter, the mixture is pasteurized at 160° F. for 30 minutes and homogenized in a 2-stage homogenizer at 1500 psi/500 psi and spray dried under at an inlet temperature of 369° F. and an outlet temperature of 165° F. When the fat replacement composition as disclosed herein, is used in cookie cream fillings intended to be labeled as being fat-free, the fat replacement composition should usually comprise less than 6%, preferably between about 3 and about 5%, of the cookie cream filling. Up to about 10% of the fat replacement composition may be employed in cookie cream fillings which are low fat or which include some actual fat.

The prepared fat replacement composition is then used to prepare a cookie filling. The cookie filling contains from about 60 to about 85% sweetener, from about 0.1 to about 1% gelling agent, from about 0.1 to about 2% flavoring agents, and other minor ingredients such as coloring agents, preservatives, etc., from about 0.2 to about 1.5% starch, from about 3 to about 10% fat replacement composition, from about 10 to about 20% high fructose corn syrup and from about 10 to about 20% of a polyhydric alcohol humectant, such as glycerine, glycol and pentaerythritol. The cookie cream filling contains no added water.

The gelling agent may be selected from any of the well known edible polysaccharide gums, such as carrageenan, alginates, guar gum, carob bean gum, gum tragacanth, xanthan gum or gum karaya. The gum is preferably carrageenan.

The sweetener is sugar, preferably powdered sugar. The powdered sugar is preferably 10X.

The starch is selected from the group consisting of tapioca starch, corn starch, rice starch or potato starch. The starch may be modified or unmodified. A preferred starch is marketed under the tradename MIRAGEL™ 483, which is a modified tapioca starch.

The high fructose corn syrup has a dextrose equivalent of from about 40 to about 65. High fructose corn syrup typically contains about 42% fructose.

The cookie cream filling is prepared by first dispersing the gelling agent in a small portion of the high fructose corn syrup, i.e., from 5% to about 20% of the total amount of high fructose corn syrup, to form a gel. All of the dry ingredients, including the fat replacement composition, are then blended. The gel, the remaining high fructose corn syrup, any liquid flavors and the glycerine are added to the dry ingredients in a suitable mixer, such as a HOBART mixer, and are mixed for about 6 to 10 minutes to provide the cookie cream filling.

The following examples further illustrate the present invention, but are intended in no way to limit the scope of the invention as set forth in the claims.

EXAMPLE 1

A fat replacement composition in accordance with the present invention was prepared. 9.97 pounds of a mixture of mono and diglycerides sold under the tradename SUPER G10™ by AC Humko (43% alpha monoglycerides, IV 68.0) was introduced into a kettle and heated to 160° F. to melt the mixture. A mixer was then turned on and 3.15 pounds of diacetyl tartaric acid ester monoglycerides sold under the tradename PANODAN 205™ by Danisco was added to the tank along with 0.56 pounds of 95% solids sodium caseinate and 1.6 pounds of a 50% solids dipotassium phosphate. 25.4 pounds of FIBRULINE™ brand inulin was slowly added to the mixture at 160° F. for 30 minutes and homogenized in a 2-stage homogenizer at 1500/500 psi after which it was spray dried under conditions so as to avoid carmelization. The spray dried product contained 63.85% inulin, 24.93% mono and diglycerides and 7.88 percent DATEM.

EXAMPLE 2

The following cookie filling formulations were prepared:

| Ingredient | #1 Grams | #1 % | #2 Grams | #2 % |
|---|---|---|---|---|
| Carrageenan | 0.96 | 0.11 | 0.48 | 0.11 |
| Potassium Sorbate | 0.50 | 0.06 | 0.25 | 0.06 |
| Powdered Sugar 10x | 546.0 | 65.07 | 300.00 | 66.44 |
| Fat Replacement Composition of Example 1 | 42.1 | 5.02 | 21.05 | 4.66 |
| Starch MIRAGEL ™ 463 | 4.7 | 0.58 | 2.35 | 0.52 |
| Titanium Oxide | 2.3 | 0.27 | 1.15 | 0.25 |
| Salt | 1.1 | 0.13 | 0.55 | 0.12 |
| Natural Vanilla, powdered | 0.7 | 0.11 | 0.45 | 0.10 |
| Sodium Aluminum Phosphate | 0.5 | 0.06 | 0.25 | 0.06 |
| High Fructose Corn Syrup ISO-100 | 120.0 | 14.30 | 65.00 | 14.40 |
| Glycerine | 120.0 | 14.30 | 60.00 | 13.29 |
| Total | 839.06 | 100.00 | 451.53 | 100.00 |
| Water Activity | 0.369 | | | |

The carrageenan was dispersed in 15 grams of the high fructose corn syrup to provide a gel. The dry ingredients were added to the bowl of a HOBART™ mixer and were blended. The gel and remaining liquid ingredients were added to the bowl and mixing on low speed was conducted for 1 minute. The bowl was scraped and mixing on medium speed was continued for 4 minutes. The bowl was again scraped and mixing was continued for 1 minute to provide the cookie cream filling.

The two cookie cream fillings of the invention were compared to commercial reduced fat (50%) cookies.

Commercial OREO™ cookies (50% reduced fat) were used as the control. They contain 3.5 grams of fat per serving size (3 cookies, 32 g). The cookie cream filling was scraped from 100 of the OREO™ cookie wafers. Fifty of the scraped cookie wafers were then filled with each of the cookie cream fillings of Examples #1 and #2 using approximately the same amount of cookie cream filling (3.5 g). Filled cookies were sealed in plastic bags, labeled with date of preparation. The two formulas of Examples #1 and #2 were tested vs. the control.

The following attributes were examined: 1) taste; 2) crunchiness of cookie (as an indicator of water migration); 3) color/appearance of filling; and 4) ability to twist cookies apart.

Testing was carried out for approximately 120 days, with sampling every 2 weeks. The results are shown in the following table. The control remained off color and flavor was not as good as expected.

Formula #1 (water activity=0.369) kept its nice white color, flavor was preferred and remained good, filling seemed to become slightly chewy but not unacceptable. Cookie stayed crunchy and was still able to twist off filling without breaking.

Formula #2 (water activity=0.428) kept its white color and good flavor. Cookie finally began to exhibit slightly reduced crunchiness.

The conclusion was that our cookie cream filling, #1, performed well, being preferred in flavor and color to the control. Cookie filling #1 is not as soft as the control, but did not contribute to any detectable water migration into the cookie.

| Days Elapsed | Control | #1 | #2 |
|---|---|---|---|
| 1 (8 days)<br>2 (12 days) | color is off-white, not wet, tastes stale | white color, not wet, good flavor | white color, not wet |
| 1 (13 days)<br>2 (9 days) | off-white, slightly gritty filling | white, crunchy cookie, twists off, chewier filling | white color, very slightly moister than control, twists, sort of (filling breaks), crunchy cookie |
| 1 (25 days)<br>2 (21 days) | off-white color, twists off easily | crunchy cookie, twists off well, filling still spread uniformly across cookie, good flavor | crunchy, twists off, sort of (filling breaks), good flavor, slightly chewy filling |
| 1 (33 days)<br>2 (29 days) | color yellowish, twists easily, filling still spread over whole surface, taste-smooth, crunchy cookie | color white, twists with effort, filling spread evenly over whole surface, taste slightly chewy, slightly less crunchy cookie | color white, twists with slight force, filling breaks, doesn't cover surface, taste slightly chewy, slightly less crunchy cookie |
| 1 (43 days)<br>2 (39 days) | twists easily, filling on both sides; crunchy cookie | twists with slight effort, filling on both sides of cookie, crunchy cookie | twists with effort, filling only on one side; crunchy cookie |
| 1 (50 days)<br>2 (46 days) | color ivory, filling is soft | twists, firmer than control, filling is set up, crunchy cookie | filling seems firmer, chewier, twists off |
| 1 (57 days)<br>2 (53 days)<br>1 (78 days)<br>2 (74 days) | twists easily, spread evenly | twists off, spread evenly, chewy filling hardening, still twists off, crunchy cookie | twists off, filling tears, slightly chewy filling hardening (harder biting through it than control) |
| 1 (91 days)<br>2 (87 days) | twists, flavor not so good | twists, good flavor, still crunchy | |
| 1 (120 days)<br>2 (117 days) | twists easily, crunchy cookie, smooth filling but gritty | twists with force, filling slightly chewy, good flavor | slightly mushy cookie |

What is claimed is:

1. A cookie cream filling having a water activity below about 0.37 comprising between about 60 and 85% sweetener, between about 0.1 and about 1% of a gelling agent, between about 0.2 and about 1.5% starch, between about 10 and about 20% of high fructose corn syrup, between about 10 and about 20% of a polyhydric alcohol and about 3 and about 10% of a fat replacement composition comprising:
   (a) between about 60 and about 93 percent by weight inulin;
   (b) between about 4 and about 30 percent by weight of a first emulsifier selected from mono- and diglycerides, propylene glycol monoesters, lactic acid ester of monoglycerides and mixtures thereof; and
   (c) between about 3 and about 20 percent by weight of a second emulsifier selected from the group consisting of diacetyl tartaric acid ester of monoglycerides, lecithin and mixtures thereof.

2. A cookie cream filling in accordance with claim 1 wherein the water activity is from about 0.25 to about 0.37.

3. A cookie cream filling in accordance with claim 1 wherein said gelling agent is selected from the group consisting of carrageenan, alginates, guar gum, carob bean gum, gum tragacanth, xanthan gum and gum karaya.

4. A cookie cream filling in accordance with claim 3 wherein said gum is carrageenan.

5. A cookie cream filling in accordance with claim 1 wherein said starch is selected from the group consisting of modified and unmodified tapioca starch, corn starch, rice starch and potato starch.

6. A cookie cream filling in accordance with claim 5 wherein said starch is a modified tapioca starch.

7. A cookie cream filling in accordance with claim 1 wherein said high fructose corn syrup has a dextrose equivalent of from about 40 to about 65.

8. A cookie cream filling in accordance with claim 1 wherein said polyhydric alcohol is selected from the group consisting of glycerine, glycol and pentaerythritol.

9. A cookie cream filling in accordance with claim 8 wherein said polyhydric alcohol is glycerine.

* * * * *